(12) United States Patent
Chalouhi et al.

(10) Patent No.: US 9,165,004 B2
(45) Date of Patent: Oct. 20, 2015

(54) ASSOCIATED CONTENT SYSTEM

(75) Inventors: Olivier Chalouhi, Redwood City, CA (US); Paul Anton Richardson Gardner, Palo Alto, CA (US)

(73) Assignee: Azureus Software, Inc., Incline Village, NV (US)

( * ) Notice: Subject to any disclaimer, the term of this patent is extended or adjusted under 35 U.S.C. 154(b) by 452 days.

(21) Appl. No.: 12/831,962

(22) Filed: Jul. 7, 2010

(65) Prior Publication Data

US 2011/0010387 A1 Jan. 13, 2011

Related U.S. Application Data

(60) Provisional application No. 61/224,769, filed on Jul. 10, 2009.

(51) Int. Cl.
*G06F 17/30* (2006.01)
(52) U.S. Cl.
CPC .... *G06F 17/30094* (2013.01); *G06F 17/30206* (2013.01)

(58) Field of Classification Search
USPC .......................................................... 707/769
See application file for complete search history.

(56) References Cited

U.S. PATENT DOCUMENTS

| | | | |
|---|---|---|---|
| 2006/0195790 A1* | 8/2006 | Beaupre et al. ................ | 715/727 |
| 2007/0192321 A1* | 8/2007 | Farr et al. ........................... | 707/9 |
| 2007/0201502 A1* | 8/2007 | Abramson ..................... | 370/429 |
| 2008/0228869 A1* | 9/2008 | Kraft et al. ..................... | 709/203 |
| 2009/0248700 A1* | 10/2009 | Amano et al. .................. | 707/10 |

\* cited by examiner

*Primary Examiner* — Amresh Singh
(74) *Attorney, Agent, or Firm* — Schwegman Lundberg & Woessner, P.A.

(57) ABSTRACT

Methods for creation of a content association system in which a client application communicates to a distributed hash table network an association between one piece of content in a client's library and one other piece of content in the client's library are described. The client creates a hash for a first file in the library and a reference to a second file in the library. The client stores the reference to the second file in the distributed hash table at a node corresponding to the hash. To discover files associated with a file in a peer's library, the peer creates a hash for a file in its library and retrieves references to other files from the distributed hash table.

24 Claims, 9 Drawing Sheets

800

| CONTENT | NUMBER OF ASSOCIATIONS | RATING | ADDITIONAL INFO |
|---|---|---|---|
| 810<br>MOVIE 2 | 812<br>5 | 814<br>3 | . . . |
| 820<br>MOVIE 3 | 822<br>3 | 824<br>7 | . . . |

ASSOCIATED CONTENT SYSTEM

CROSS-REFERENCE TO RELATED PATENT DOCUMENTS

This patent application claims the benefit of priority, under 35 U.S.C. Section 119(e), to U.S. Provisional Patent Application Ser. No. 61/224,769, entitled "Associated Content System," filed on Jul. 10, 2009, which is incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2009, Vuze, Inc. All Rights Reserved.

TECHNICAL FIELD

Example embodiments relate generally to peer-to-peer (P2P) file transfers over a network (e.g., the Internet).

BACKGROUND

BitTorrent is currently one of the most popular methods of distributing large files over the Internet. For a given file, the BitTorrent protocol embodies four main roles: an initial seeder, new seeders, a tracker, and peers. Initial seeders, new seeders, and peers are all transient clients; trackers are typically web servers. The initial seeder is the source of the file, and operates by dividing a file into small pieces, creating a metadata description of the file and sending this description to the tracker. Peers discover this file metadata description, usually as a .torrent file, through an out-of-band mechanism (e.g., a web page) and then begin looking for pieces of the file. Peers contact a central tracker to bootstrap their knowledge of other peers and seeds, and the tracker returns a randomized subset of other peers and seeds. Initially, only the initial seeder has pieces of a file, but soon peers are able to exchange missing pieces with each other. Once a peer acquires all of the pieces of a file, it becomes a new seeder. This collection of clients actively sharing a file is called a swarm.

BitTorrent client applications, however, generally are only able to access the file identified by the file metadata description (e.g., a .torrent file). Thus, accessing different files requires a peer to discover different corresponding file metadata descriptions (e.g., .torrent files). Without having a file metadata description readily accessible, content is otherwise unable to be discovered.

BRIEF DESCRIPTION OF DRAWINGS

FIG. 8 is a diagram that shows an example data structure representing a association table 800, according to an example embodiment.

DETAILED DESCRIPTION

Figure 1:
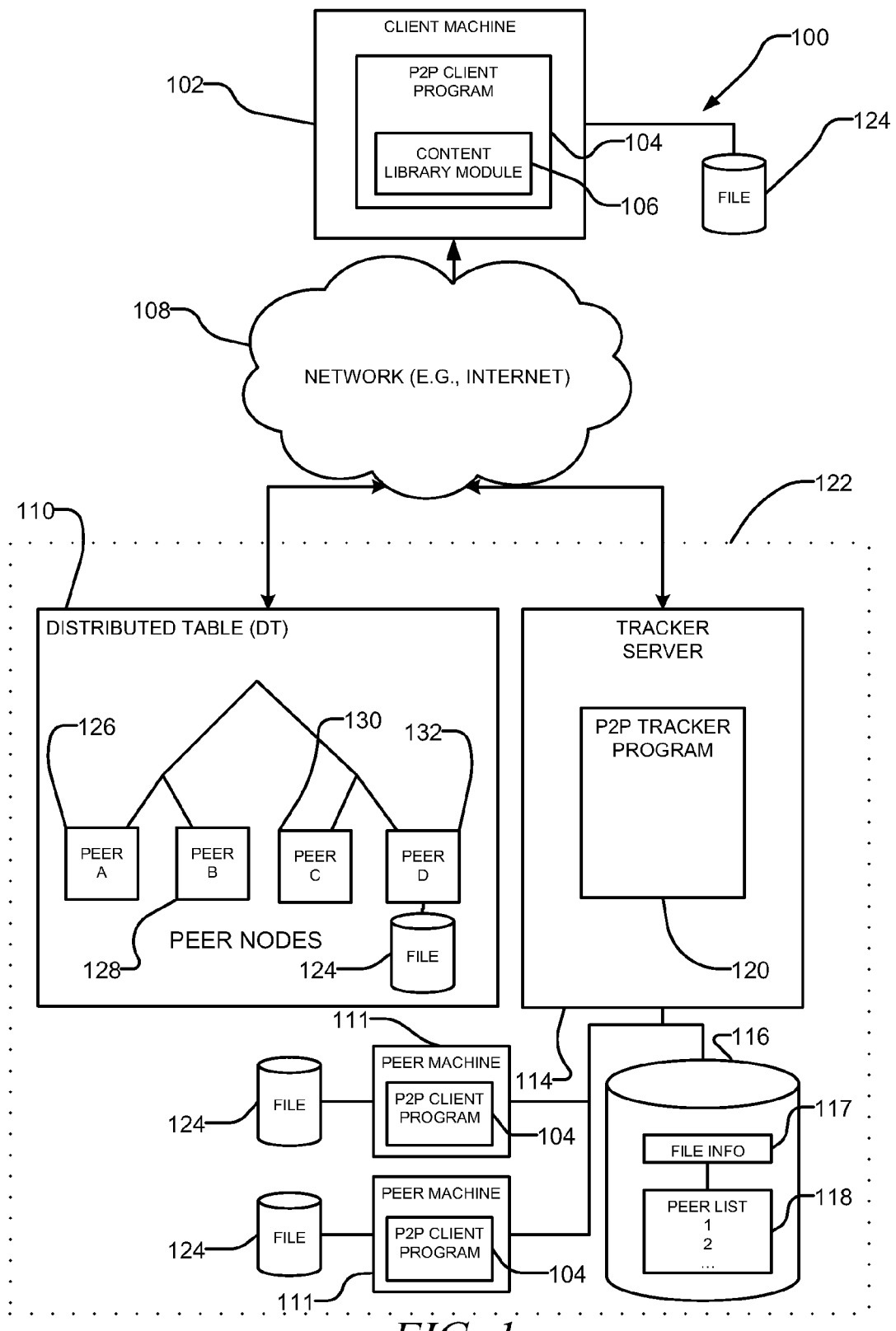
FIG. 1 is a network diagram illustrating a peer participating in a BitTorrent transfer over the Internet, according to an example embodiment.

In the following description, for purposes of explanation, numerous specific details are set forth in order to provide a thorough understanding of the claimed subject matter. It will be evident, however, to one skilled in the art that the claimed subject matter may be practiced without these specific details.

For the purposes of this specification, the term "content" or "electronic content" shall be taken to include any digital data and may include page-descriptive electronic documents, media streams, web pages, hypertext documents, software applications or programs, images, digital videos or video recordings, digital audio or audio recordings, and animation, merely for example.

For the purposes of this specification, "association data" may identify a relationship between a first content and a second content. In some example embodiments, the association data may additionally identify a relationship between the first content and a third content. The association may identify a one-to-one relationship or one-to-many relationship. Such relationships may indicate that a consumer interested in a first content may also have an interest in a second content. Examples of such indications include any number of criteria, or combinations thereof, including: the two or more content being stored together in a content library of a user, geographic locations of users, a date upon which content associations were made, a length of time that the content has been in the content library, whether certain content was deleted from a client's library, demographic data about a user (e.g., age, sex, occupation), a source of the content, or a correlation between the titles of the content. The relationship may be inferred, for example, based on one or more processors correlating titles or determining one or more correlations between other properties of the content, such as authors, genres, publication date, or any other similar criteria. In other example embodiments, the relationship may be explicitly defined by the user (e.g., from a graphical interface, a user indicates that the first and second content are to be associated).

In some example embodiments, association data may include a reference to the first or second content. The reference may be a means to download the associated content (e.g., a hash or a .torrent file) or information usable to locate the content through a search (e.g., a filename or other metadata). An example of information usable to locate content through a search includes a name of the content and connection information to at least one tracker serving the content.

For the purposes of this specification, "embedded secondary data" or "metadata" may be defined as information that specifies characteristics of the content, in an example embodiment. Metadata may be embedded within the content, or, in alternative embodiments, metadata may be stored outside of the content. As will be described in detail below, metadata may describe various aspects of content, such as an association between a first and second content.

Metadata may be embedded within a file or other data structure containing the content. In alternative embodiments, a separate data structure, file, or other mechanism may store the metadata. The metadata does not necessarily need to be presented or made accessible when the content is presented (or otherwise made accessible to a user or as input to a machine).

For the purposes of this specification, an "identifier" may describe a data item used to identify or locate a resource, such as, for example, a network node, peer, seed, tracker, content, association, or any other resource within a P2P network. In an example embodiment, an identifier may be a key generated from some aspect of the content and a hash function. The generated key may map to a node of a distributed table. In other example embodiments, the identifier may be a reference that facilitates communication, such as, for example, a uniform resource identifier (URI), uniform resource locator (URL), internet protocol address and port number, filename, index, or any other location descriptor.

For the purposes of this specification, a "distributed table" may describe a class of decentralized distributed systems that provide a lookup service to stored content. In some example embodiments, the distributed table may be similar to a hash table that stores key-value pairs. The key may be an identifier for the content, in some example embodiments. In other example embodiments, the value may be stored information related to the content, such as connection information. An example of a distributed table is a distributed hash table.

One example embodiment involves the creation of a content association system in which a BitTorrent user's client application communicates, to a distributed table (DT), association data describing a relationship between one piece of content in the user's content library and one other piece of content in the user's content library. When a second user downloads a piece of content, a look up may be conducted for existing content associations contained in the DT. Associations with other pieces of content are displayed to the second user. The display of associations can be ranked based solely upon the incidence of appearance of associations, but can also be filtered and ranked using any number of other criteria.

Consequently, the association data provides for improved distribution of content available in a P2P network. Moreover, the association data is useful to the P2P network in that a set of content likely to be of interest to the user, based on the content in the user's content library, may be identified.

FIG. 1 is a block diagram illustrating a peer-to-peer (P2P) networking environment 100 within which a P2P client program 104 containing a content library 106 runs on a client machine 102. The client machine 102 is connected to a swarm 122, which comprises a group of peers 111, 126, 128, 130, and 132, in order to distribute a file 124 over a network 108. The P2P client 104 may be connected to the swarm 122 after receiving Internet Protocol (IP) addresses and ports identifying peers from a tracker server 114 and a distributed table network 110 (DT). The P2P client 104 may also send its IP address and port information to the tracker server 114, which may add the P2P client 104 to the peer list 118 for that file 124.

Existing and newer peers may then connect to the client machine 102 to send and receive pieces of the file 124 being distributed.

Figure 2:
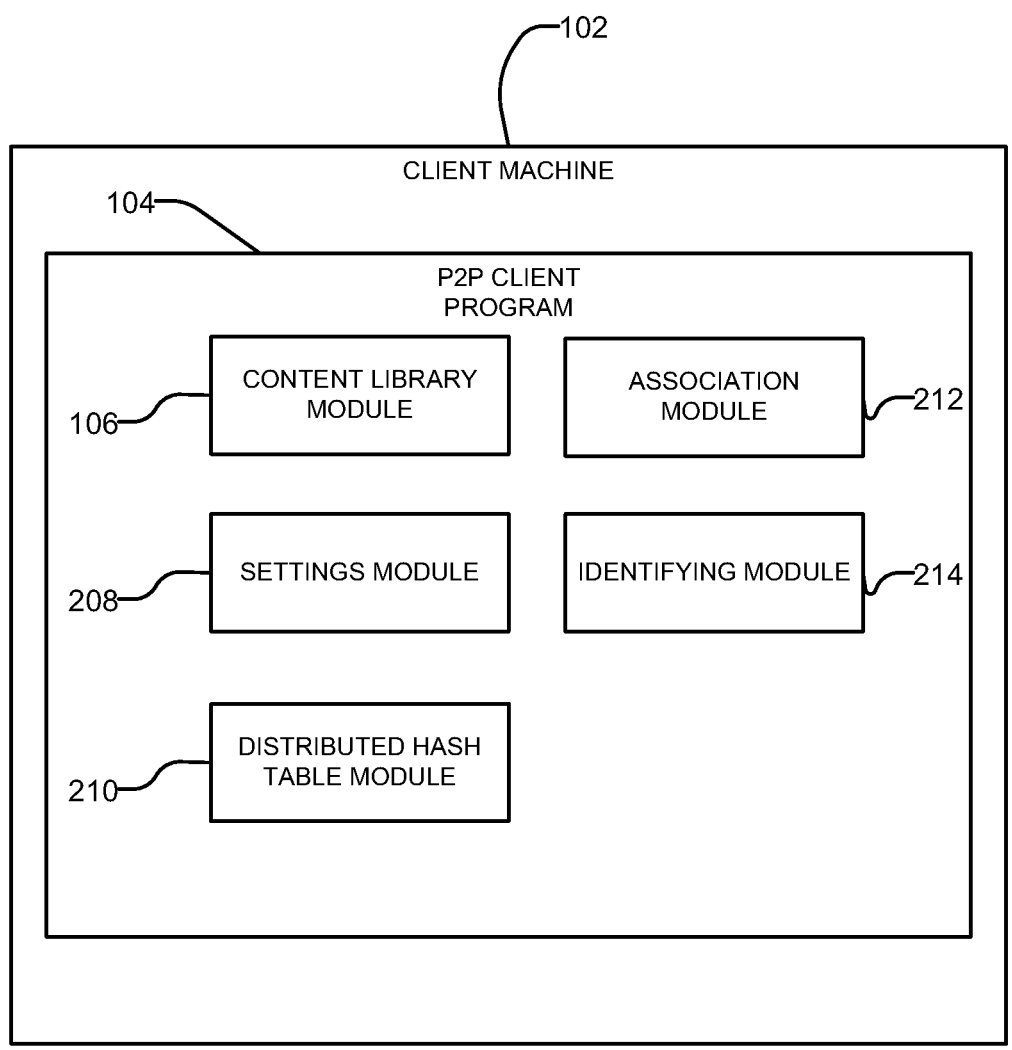
FIG. 2 is a block diagram of modules, according to an example embodiment, contained in a peer-to-peer (P2P) client program running on a client machine.

FIG. 2 is a block diagram of modules, according to an example embodiment, contained in a P2P client program 104 running on a client machine 102. The P2P client program 104 contains modules to perform the operations of an example embodiment, including a content library module 106 to manage downloaded content, a settings module 208 to store preferences such as file priorities, a distributed table module 210 for connecting to and communicating with the DT 110, an association module 212 for creating and requesting associations, and an identifying module 214 for creating identifiers.

Figure 3:
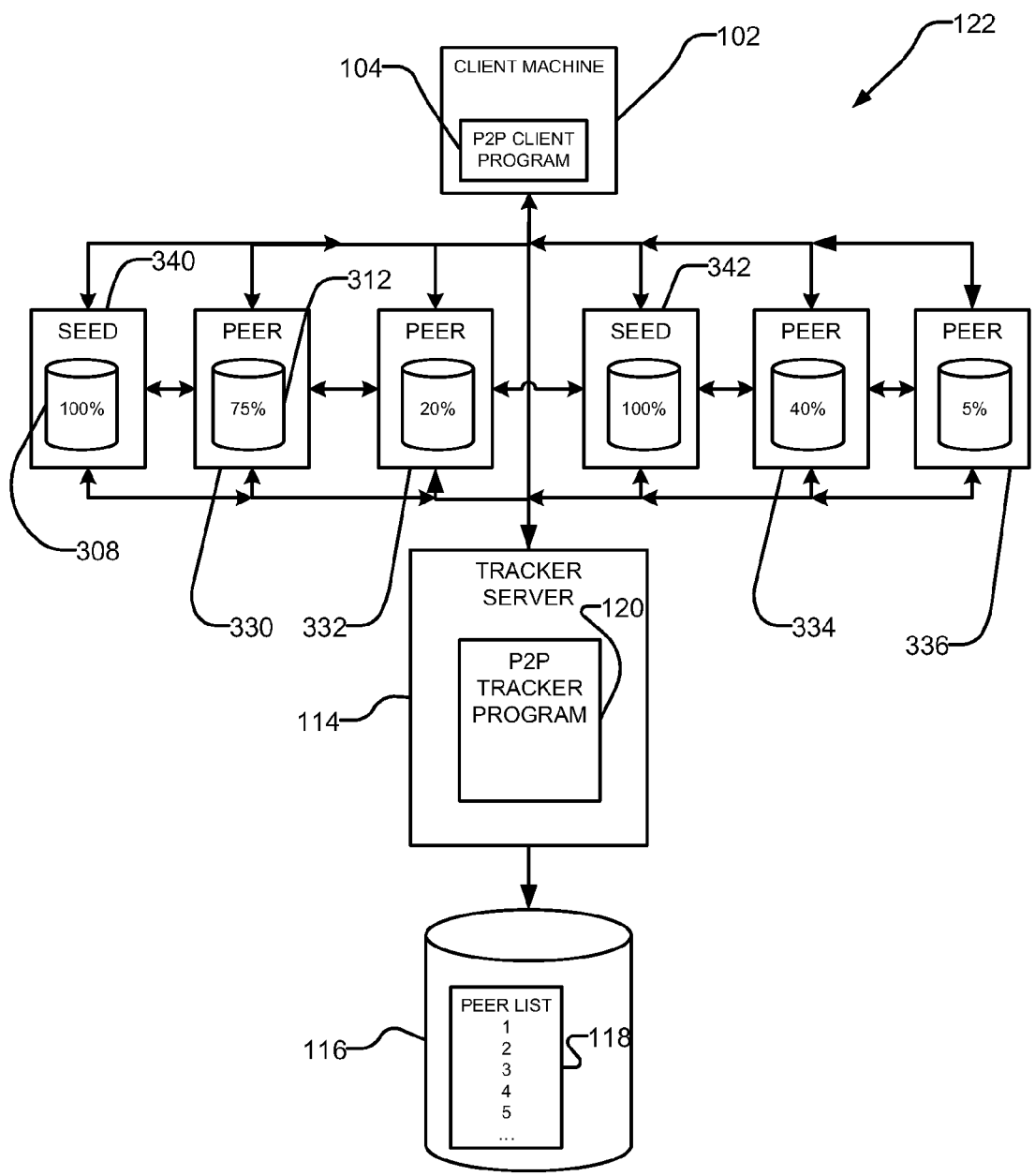
FIG. 3 is a network diagram illustrating a BitTorrent swarm containing peers and seeds connected to each other and a tracker, according to an example embodiment.

FIG. 3 is a block diagram illustrating a BitTorrent swarm 122 within which example embodiments may be deployed and within which peers 330, 332, 334, 336 and seeds 340, 342 are connected to one another and to a tracker server 114 over a network 108. For each .torrent file, there may be listed more than one tracker server 114 running different P2P tracker programs 120 that contain unique peer lists 118 of each swarm member in a database 116. Multiple tracker servers 114 provide redundancy in case one of the servers becomes unreachable over the Internet. It is also possible for a .torrent file to specify no trackers and instead rely on distribution methods that use the distributed table network 110, for example.

Seeds 340, 342 are a subset of peers that have received all pieces of the file 124 and are thus only uploading data to peers 330, 332, 334, 336 in the swarm 122. Non-seeding peers may have only partially completed the file 124 and are therefore both uploading and downloading data from the swarm. When a peer finishes downloading all pieces of the file 124, it becomes a new seed and no longer needs to be connected to other seeds. All peers, including the seeds, may periodically contact the tracker server 114 to update their knowledge of the peer list 118.

Figure 4:
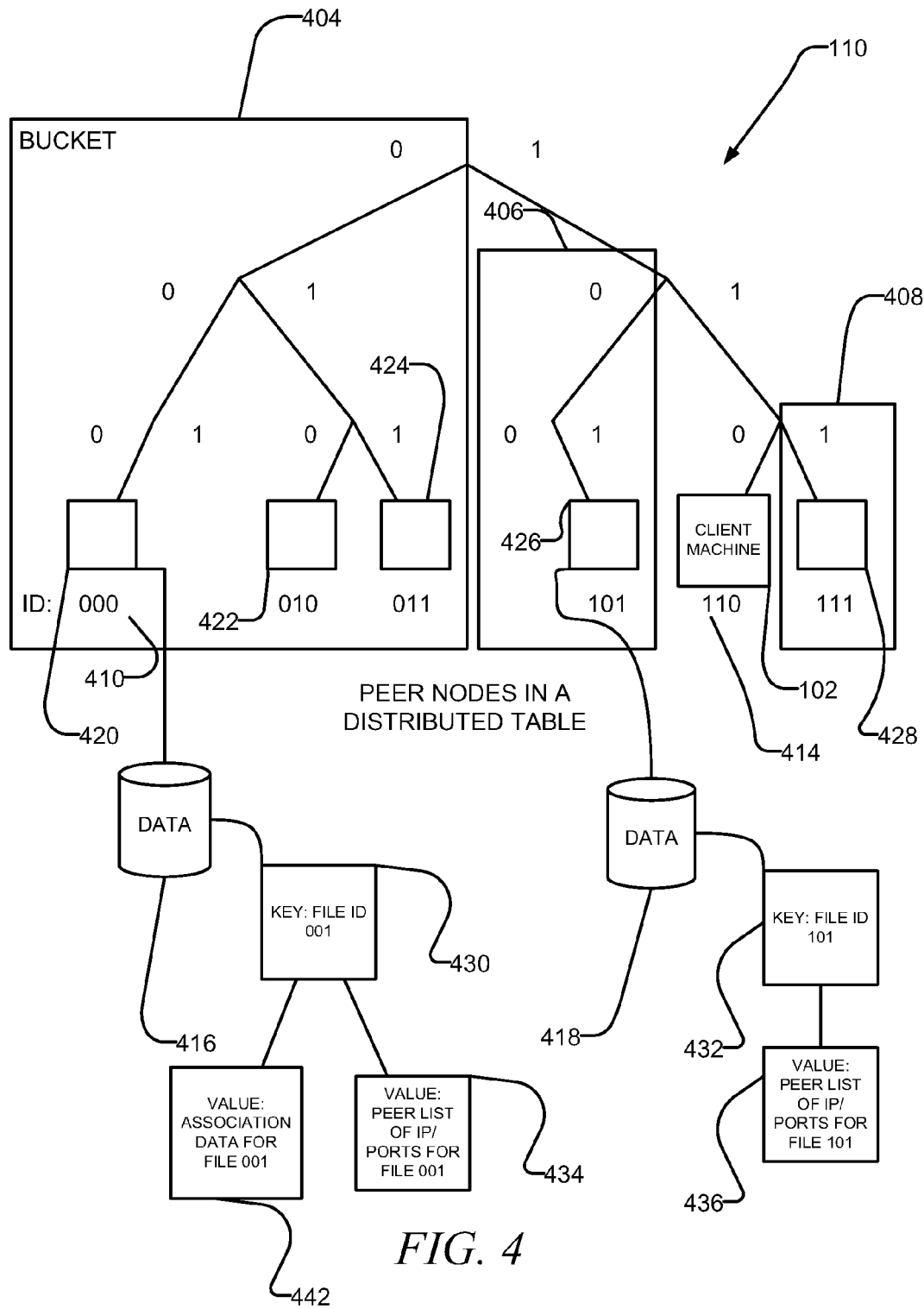
FIG. 4 is a block diagram of a DT tree showing node IDs and distance buckets, according to an example embodiment.

FIG. 4 is a network partition of a DT 110 containing the client machine 102 and peer nodes 420, 422, 424, 426, and 428 stored in buckets 404, 406, and 408. In this simplified example, the nodes are indexed in the DT with a three-bit ID 410, 414 (typical implementations use 160 bits).

In a file sharing DT network, the task of indexing the table of available files is distributed among all clients. A hash or other identifier is computed for each file. The size of the identifier may be the same size as the identifiers of the nodes. If a user wishes to share a file 430, 432 among users of the DT 110, the client uses the created identifier as a key 430, 432 to find the ID of a node that is most similar to the identifier. To allow other peers to download the particular content, the client transmits connection information to the node corresponding to the identifier. The node may store the received connection information in databases 416, 418. Similarity between a node and an identifier may be determined by a distance algorithm that computes the exclusive-or (XOR) of the identifier and the node ID, with smaller values representing closer matches, for example.

In FIG. 4, the peer list 436 for file 432 with the identifier of '101' is stored in the node 426 with the ID '101' because the file identifier and node ID match; the peer list 434 for file 430 with the identifier of '001' is stored in the node 420 with the ID '000' because node ID '001' does not exist and '000' is the closest match. In typical implementations, DT keys and values are stored in the closest twenty nodes to the identifier to provide for redundancy in a network that regularly loses and gains nodes and also to defend against malicious nodes that attempt to disrupt the network. Peers also retrieve data from the closest twenty nodes.

In addition to sending connection information, clients may also send association data to the DT. FIG. 4 shows that association data 442 for file 430 with the identifier of '001' is stored in the node 420 with the ID '000'. As described above the association data 442 may include a reference to content related to file 430 to allow users of the P2P network to download related files. The association data, as will be described below, may include additional information to allow the client P2P program to filter or rank associations of file 430. The association data 442, similar to DT keys and values, may be stored in the closest twenty nodes to the identifier to provide for redundancy.

Figure 5:
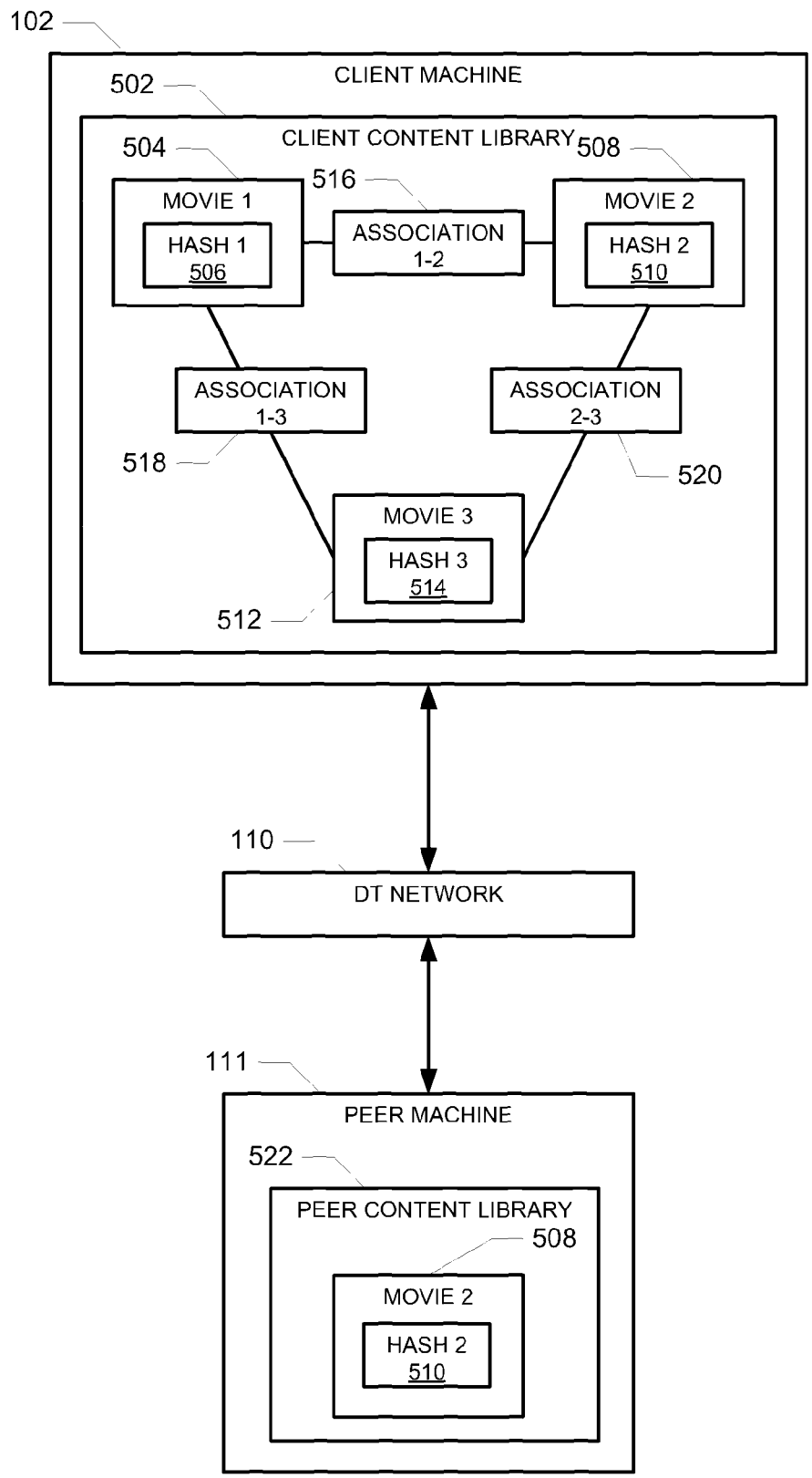
FIG. 5 is a block diagram of associations between files in a content library, as may be used in an example embodiment.

FIG. 5 illustrates a content library 502 residing on client machine 102 containing three files: movie 1 504, movie 2 508, and movie 3 512 with corresponding unique hashes hash 1 506, hash 2 510, and hash 3 514. The association module 212 creates associations between each of the files in the content library 502, e.g., association 1-2 516 represents an association between movie 1 504 and movie 2 508. Association 1-3 518 and association 2-3 520 represent their respective file associations. Peer machine 111 has a content library 522 containing movie 2 508. Both peers are connected to the same distributed table network 110.

Figure 6:
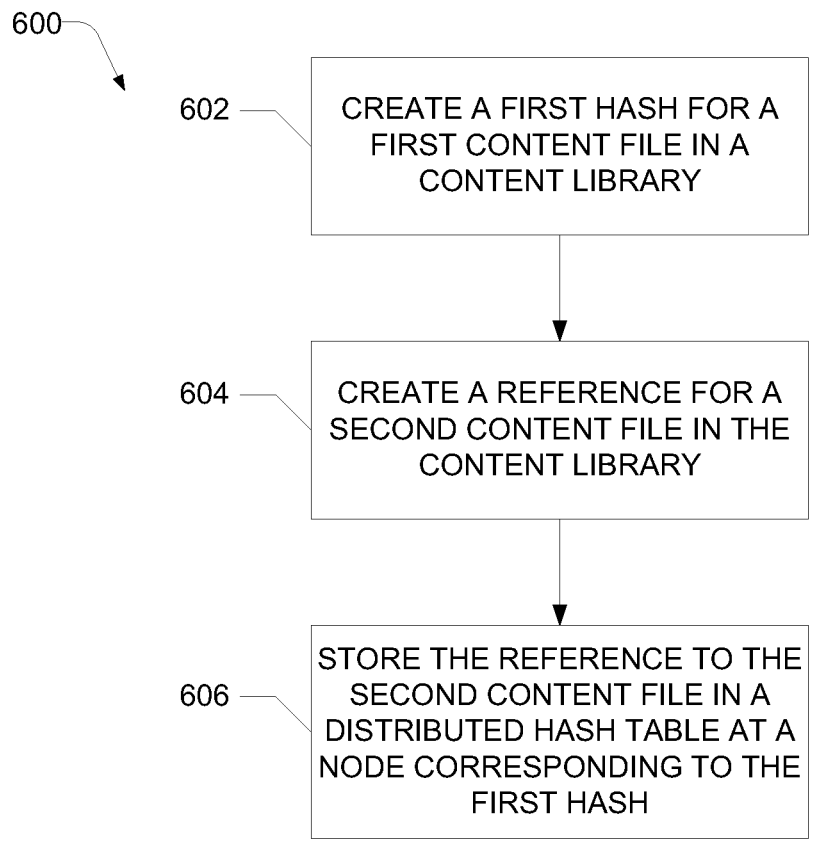
FIG. 6 is flow chart of a method of creating and storing references to associated files in a distributed table network according to an example embodiment.

FIG. 6 illustrates a method 600 of creating and storing references to associated files in a distributed table network 110 according to an example embodiment. The identifying module 214 creates a hash or other identifier for a first file in the client content library 502 at operation 602. The association module 212 creates a reference to a second content file in the client content library 502 at operation 604. The reference may be a means to download the associated files or the filename or other metadata usable to locate the file through a search. The latter example may apply in a case where the hash is not publicly acceptable, such as in a private torrent system. In one example embodiment for a public torrent, the reference to the second content file is the hash for the second content file and its title. The hash allows a peer to retrieve a list of peers from the DT 110 that have the second content file, and therefore the peer can download the second content file using the hash. In another example embodiment for a private torrent, the reference is the name of the second content file and at least one tracker serving the file. At operation 606, the distributed table module 210 stores the reference to the second content file in the distributed table 110 at a location corresponding to the hash for the first file.

In one example embodiment, information about content and content associations is published anonymously to the DT 110. Publication of one randomly selected association is done at the time the P2P client program 104 is launched or, in another example embodiment, at a recurring interval of time during program execution. The preference for doing a single random association at a time may be to limit the amount of information published at any one time and therefore limit the load on the user's client program and the DT 110. The P2P client program 104 periodically publishes new random associations from the client content library 502 such that over time, associations between an increasing portion of the content in the client content library 502 may be published to the DT 110 and, therefore made accessible to peers connected to the DT 110.

In another example embodiment, users manually identify one or more pieces of content to associate and communicate to the DT 110. Thus, rather than making random associations with all content in the client content library 502, the associations would be made with content deemed to be more popular or more desirable by the user.

Figure 7:
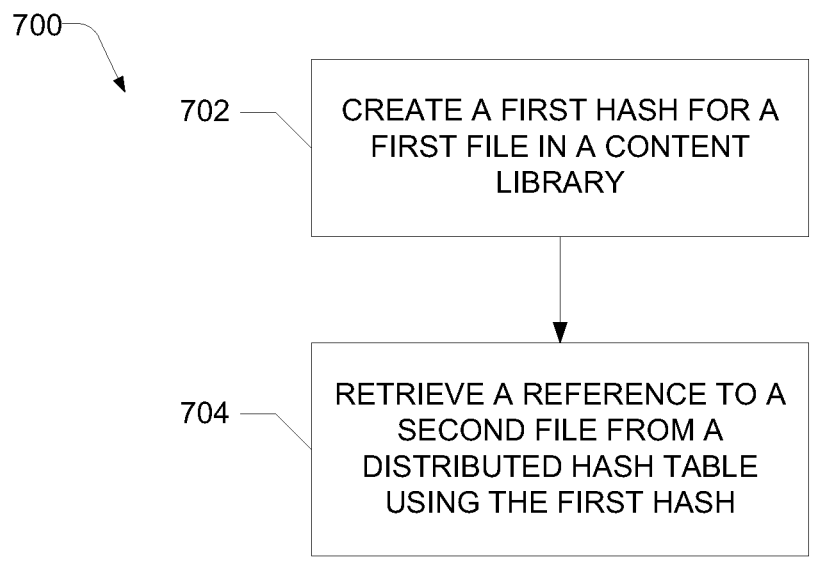
FIG. 7 is flow chart of a method of using an associated content system to retrieve associated files from a distributed table network according to an example embodiment.

FIG. 7 illustrates a method 700 of using the associated content system to retrieve associated files from the distributed table network 110 according to an example embodiment. A peer machine 111 connected to the DT 110 creates a hash of a file in the peer content library 522 and uses that hash to identify a node in the DT 110. The peer machine 111 then retrieves the references to associated files stored by the identified node. Other example embodiments may create other identifiers of the file.

In one example embodiment, a peer with a content library can automatically perform background lookups of its content to build up a picture over time of other people's associations and the strength of these associations, giving the opportunity to display an evolving map of content that the peer may be interested in. In another embodiment, the peer can explicitly query the associations for content to get real-time responses.

FIG. 8 is a diagram that shows an example data structure representing a association table 800, according to an example embodiment. The association data 800, or some portion thereof, may be stored by the client P2P program or by the DT node to rank or filter associations. The association table 800 facilitates ranking associations according to the strength of the association.

The association table 800 includes a content column 802, a number of associations column 804, a rating column 806, and additional information column 808.

The content column 802 identifies the content being described by the respective row. For example, row 810 describes movie 2, as shown in element 812, while row 820 describes movie 3, as shown in element 822.

The number of associations column 804 describes the number of clients reporting an association between the specified content (e.g., movie 1) and the content identified by the content column 802. As an example, the association table 800 element 812 shows that movie 1 has been associated with movie 2 five times, while element 814 shows movie 1 has been associated with movie 3 three times. Thus, under this example embodiment, movie 1 may be considered to have a stronger association with movie 2 rather than with movie 3, according to an example embodiment.

Beyond using the number of associations 804 to rank associations between content, the associated content system may apply additional or alternate criteria to rank and display content options. In an example embodiment, the associated content system captures ratings of content created by the client machine 102 and also communicates that information to the DT 110. As shown by FIG. 8, the association table 800 stores respective ratings for movie 2 and movie 3, at elements 814 and 824. More highly rated content by clients may be weighted more heavily in determining which associations to show first or rank higher. In some example embodiments, the elements 814 and 816 of the rating column 806 are recorded as averages computed based on the ratings submitted by peers. In other example embodiments, ratings are recorded based on a per category basis.

In an example embodiment, other such criteria may be used to rank associations. For example, the system may factor in one or more of the following criteria that may be stored in the additional information column 808: geographic location of users; date upon which content associations were made; how long the content has been in a client's library; the fact that certain content was deleted from a client's library; demographic data about a user, such as age or sex; the original source of the content; or correlation of the contents' titles.

In another example embodiment, the associations are made 1-to-many instead of 1-to-1. Thus, in the above example of three movies, under an association scheme that maps one content to two associated content, the hash generated from content 1 may return associations data including content 2 and content 3. Likewise, the hash generated from content 2 may return association data including content 1 and content 3. Finally, the hash generated from content 3 may return association data including content 1 and content 2.

Certain embodiments are described herein as using hashes as a reference. As described above, a hash is a type of identifier used to locate an appropriate node in the distributed table. Other embodiments may also use other types of identifiers.

Modules, Components and Logic

Certain embodiments are described herein as including logic or a number of components, modules, or mechanisms. A component is a non-transitory and tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component may be implemented mechanically or electronically. For example, a component may comprise dedicated circuitry or logic that is permanently configured (e.g., as a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, one component may perform an operation, and store the output of that operation in a memory device to which it is communicatively coupled. A further component may then, at a later time, access the memory device to retrieve and process the stored output. Components may also initiate communications with input or output devices, and can operate on a resource (e.g., a collection of information).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Example Machine Architecture and Machine-Readable Medium

Figure 9:
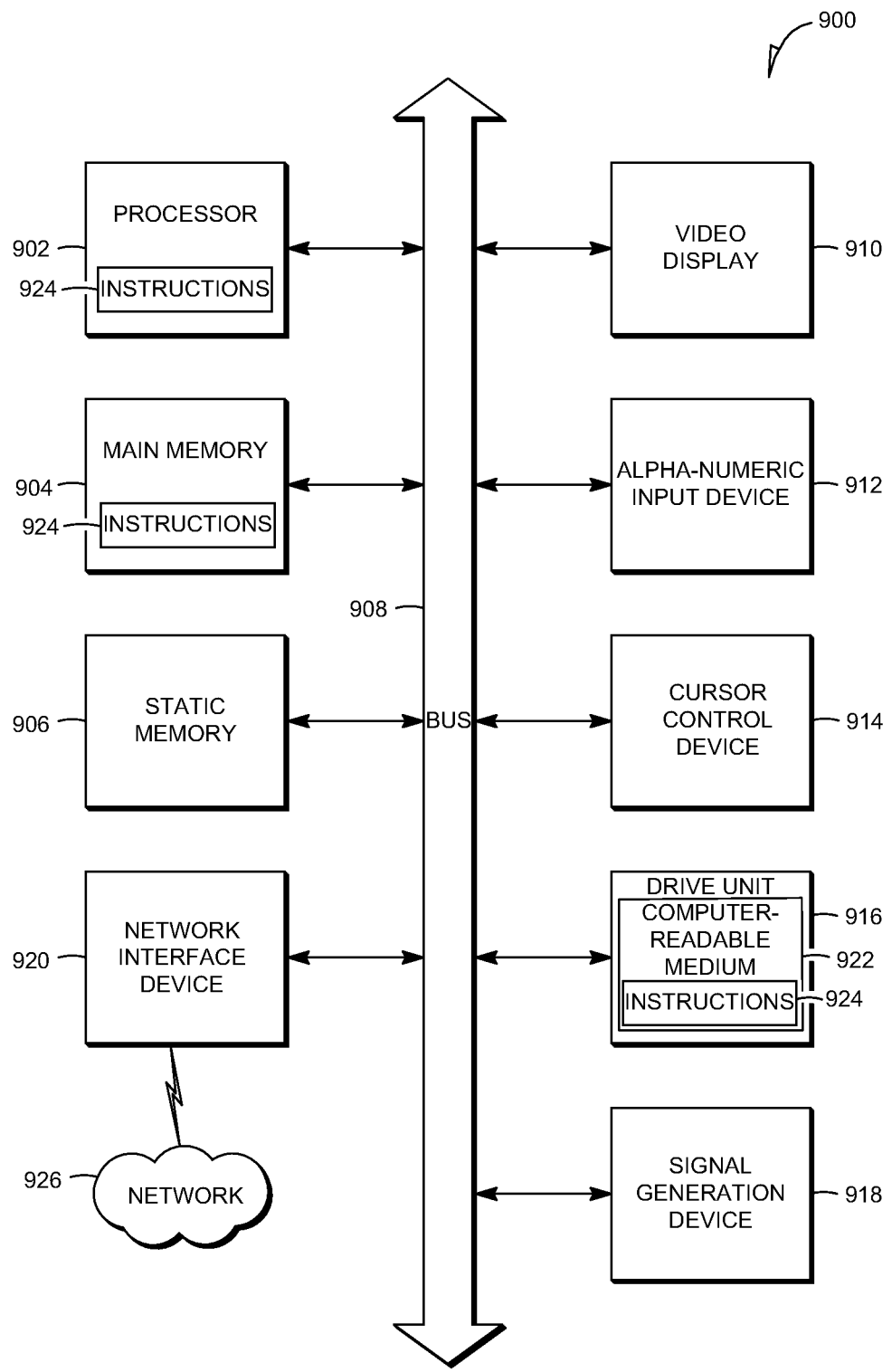
FIG. 9 is a block diagram of machine in the example form of a computer system within which a set instructions, for causing the machine to perform any one or more of the methodologies discussed herein, may be executed.

FIG. 9 is a block diagram of machine in the example form of a computer system 900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine 102 in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes at least one processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of instructions and data structures (e.g., software 924) embodying or utilized by any one or more of the methodologies or functions described herein. The software 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 924 may further be transmitted or received over a communications network 926 using a transmission medium. The software 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible medium to facilitate communication of such software.

Example Three-Tier Software Architecture

In some embodiments, the described methods may be implemented using a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or so some other suitable configuration. Further, these three tiers may be distributed between more than one computer systems as various components.

Components

Example embodiments may include the above described tiers, and processes or operations about constituting these tiers may be implemented as components. Common to many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above-described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client, or between peer computer systems may for example include five layers comprising: an application layer, a transport layer, a network layer, a data link layer, and a physical layer. In the case of software, for instantiating or configuring components, having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A computer-implemented method to facilitate peer-to-peer networking, the computer-implemented method comprising:
creating an identifier based on a first content stored in a content library in a first peer-to-peer client on a first client machine controlled by a first user, the first content including first metadata and a first media item;
using the identifier to retrieve, from a distributed node, a plurality of associations between the first content and other pieces of content stored in content libraries in peer-to-peer clients on client machines not controlled by the first user, each of the associations representing a relationship between the first content stored in a content library in a peer-to-peer client on a client machine controlled by an other user and another piece of content also stored in the content library in the peer-to-peer client on the client machine controlled by the other user, each of the associations also indicating a tracker serving the another piece of content, each of the associations being based at least partially on the storage of both the first content and the another piece of content in the content library in the peer-to-peer client on the client machine controlled by the other user;
counting the appearances of each of the other pieces of content in the associations;
ranking the plurality of associations based upon count of the appearances of pieces of content other than the first content in the plurality of associations; and
recommending a second content to the first user based on the ranked plurality of associations.

2. The computer-implemented method to facilitate peer-to-peer networking of claim 1, wherein the distributed node is a node of a distributed hash table, and the identifier is a hash value usable as a key that maps to the distributed node.

3. The computer-implemented method to facilitate peer-to-peer networking of claim 1, further comprising displaying at least one of the associations to the first user.

4. The computer-implemented method to facilitate peer-to-peer networking of claim 1, wherein each association further includes a geographic location, a creation date for the association, a length of time that the first content has been in the content library, deletion of other content, demographic data, a source of the first content, and a correlation of titles.

5. The computer-implemented method to facilitate peer-to-peer networking of claim 1, wherein the retrieving the plurality of associations between the first content and the second content is performed as part of a background process running on one or more processors.

6. The computer-implemented method to facilitate peer-to-peer networking of claim 1, wherein the retrieving the plurality of associations between the first content and the second content is performed based on receiving an explicit request to query for associations belonging to the first content.

7. A non-transitory machine-readable storage medium embodying instructions that, when executed by a machine, causes the machine to execute the computer-implemented method to facilitate peer-to-peer networking of claim 1.

8. A computer-implemented method to facilitate peer-to-peer networking, comprising:
creating association data representing an association between a first and second content stored in a content library in a first peer-to-peer client on a first client machine, the first content including first metadata and a first media item, the second content including second metadata different than the first metadata and a second media item different than the first media item, the association data also indicating a tracker serving the second piece of content, the association being based at least partially on the storage of both the first content and the second content in the content library in the peer-to-peer client on the first client machine;

identifying a network node based on a lookup using an identifier, the identifier being generated based on the first content in a content library;

transmitting the association data to the identified network node for downloading by a second peer-to-peer client on a second client machine;

creating an identifier based on a third content stored in a content library in a third peer-to-peer client on a third client machine controlled by a third user, the third content including third metadata and a third media item;

using the identifier to retrieve, from a distributed node, a plurality of associations between the third content and other pieces of content stored in content libraries in peer-to-peer clients on client machines not controlled by the third user, each of the associations representing a relationship between the third content stored in a content library in a peer-to-peer client on a client machine controlled by an other user and another piece of content also stored in the content library in the peer-to-peer client on the client machine controlled by the other user, each of the associations also indicating a tracker serving the another piece of content, each of the associations being based at least partially on the storage of both the third content and the another piece of content in the content library in the peer-to-peer client on the client machine controlled by the other user;

counting the appearances of each of the other pieces of content in the associations;

ranking the plurality of associations based upon count of the appearances of pieces of content other than the third content in the plurality of associations; and recommending a fourth content to the third user based on the ranked plurality of associations.

9. The computer-implemented method to facilitate peer-to-peer networking of claim 8, further comprising selecting the first content in the content library upon startup of a peer-to-peer client program.

10. The computer-implemented method to facilitate peer-to-peer networking of claim 8, further comprising randomly selecting the first content in the content library from a plurality of content.

11. The computer-implemented method to facilitate peer-to-peer networking of claim 8, further comprising:
after a determinable amount of time, creating an additional association data representing an association between a third and fourth content in the content library;
identifying an additional network node based on a lookup using an additional identifier, the additional identifier being generated based on the third content in the content library; and
transmitting the association data to the identified network node.

12. The computer-implemented method to facilitate peer-to-peer networking of claim 8, wherein the association data further includes an association between the first content and a third content.

13. The computer-implemented method to facilitate peer-to-peer networking of claim 8, wherein the association data is anonymous.

14. A non-transitory machine-readable storage medium embodying instructions that, when executed by a machine, causes the machine to execute the computer-implemented method to facilitate peer-to-peer networking of claim 8.

15. A computer-implemented method to facilitate peer-to-peer networking, comprising:
receiving, at a node in a peer-to-peer network, association data that identifies an association between a first content and a second content in a content library of a first peer-to-peer client within a peer-to-peer network, the first content including first metadata and a first media item, the second content including second metadata different than the first metadata and a second media item different than the first media item, the association data also indicating a tracker serving the second piece of content, the association being based at least partially on the storage of both the first content and the second content in the content library in the first peer-to-peer client;
storing the association data that identifies the relationship between the first content and the second content;
creating an identifier based on a third content stored in a content library in a third peer-to-peer client on a third client machine controlled by a third user, the third content including third metadata and a third media item;
using the identifier to retrieve, from a distributed node, a plurality of associations between the third content and other pieces of content stored in content libraries in peer-to-peer clients on client machines not controlled by the third user, each of the associations representing a relationship between the third content stored in a content library in a peer-to-peer client on a client machine controlled by an other user and another piece of content also stored in the content library in the peer-to-peer client on the client machine controlled by the other user, each of the associations also indicating a tracker serving the another piece of content, each of the associations being based at least partially on the storage of both the third content and the another piece of content in the content library in the peer-to-peer client on the client machine controlled by the other user;
counting the appearances of each of the other pieces of content in the associations;
ranking the plurality of associations based upon count of the appearances of pieces of content other than the third content in the plurality of associations; and
recommending a fourth content to the third user based on the ranked plurality of associations.

16. The computer-implemented method to facilitate peer-to-peer networking of claim 15, further comprising:
receiving, at the node, a request for information related to the first content; and
responsive to the request for the information related to the first content, transmitting the association data that identifies the association between the first content and the second content.

17. The computer-implemented method to facilitate peer-to-peer networking of claim 15, further comprising capturing a rating of the second content.

18. The computer-implemented method to facilitate peer-to-peer networking of claim 17, further comprising:
receiving, at the node, further association data that identifies an association between the first content and a third content in the content library;

storing the further association data that identifies the relationship between the first content and the third content; and ranking the association between the first and the second content higher than the association between the first content and the third content based on respective ratings of the second and third content.

19. A non-transitory machine-readable storage medium embodying instructions that, when executed by a machine, causes the machine to execute the computer-implemented method to facilitate peer-to-peer networking of claim 15.

20. A system to facilitate peer-to-peer networking, the system comprising:

at least one processor;

an identifying module, implemented by the at least one processor, configured to create an identifier based on a first content stored in a content library of a first peer-to-peer client on a first client machine;

a distributed hash table module, implemented by the at least one processor, configured to retrieve, from a distributed node, an association between the first content and a second content stored in the content library of the first peer-to-peer client on the first client machine using the identifier, the first content including first metadata and a first media item, the second content including second metadata different than the first metadata and a second media item different than the first media item, the association also indicating a tracker serving the second piece of content, the association being based at least partially on the storage of both the first content and the second content in the content library of the first peer-to-peer client on the first client machine; and an association module, implemented by the at least one processor, configured to store the association;

the identifying module further configured to create an identifier based on a third content stored in a content library in a third peer-to-peer client on a third client machine controlled by a third user, the third content including third metadata and a third media item;

the association module further configured to use the identifier to retrieve, from a distributed node, a plurality of associations between the third content and other pieces of content stored in content libraries in peer-to-peer clients on client machines not controlled by the third user, each of the associations representing a relationship between the third content stored in a content library in a peer-to-peer client on a client machine controlled by an other user and another piece of content also stored in the content library in the peer-to-peer client on the client machine controlled by the other user, each of the associations also indicating a tracker serving the another piece of content, each of the associations being based at least partially on the storage of both the third content and the another piece of content in the content library in the peer-to-peer client on the client machine controlled by the other user, count the appearances of each of the other pieces of content in the associations, rank the plurality of associations based upon count of the appearances of pieces of content other than the third content in the plurality of associations, and recommend a fourth content to the third user based on the ranked plurality of associations.

21. The system to facilitate peer-to-peer networking of claim 20, wherein the distributed node is a node of a distributed hash table, and the identifier is a hash value usable as a key that maps to the distributed node.

22. The system to facilitate peer-to-peer networking of claim 20, further comprising a content library module configured to enable displaying the association between the first content and the second content to a user.

23. The system to facilitate peer-to-peer networking of claim 20, wherein the association module is further configured to:

receive an additional association, the additional association being between the first content and a third content; and rank the association and the additional association based on a strength of association.

24. The system to facilitate peer-to-peer networking of claim 23, wherein the strength of association includes at least one of: a geographic location, a creation date for the association, a length of time that the first content has been in the content library, deletion of other content, demographic data, a source of the first content, and a correlation of the titles.

* * * * *